UNITED STATES PATENT OFFICE.

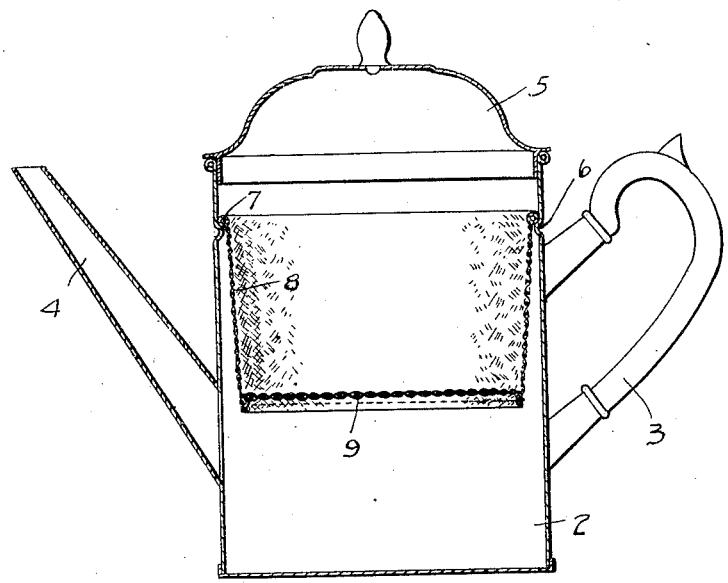

HARVEY RICKER, OF MINNEAPOLIS, MINNESOTA.

COFFEE-POT.

SPECIFICATION forming part of Letters Patent No. 686,989, dated November 19, 1901.

Application filed November 6, 1900. Serial No. 35,609. (No model.)

*To all whom it may concern:*

Be it known that I, HARVEY RICKER, of Minneapolis, Hennepin county, Minnesota, have invented certain new and useful Improvements in Coffee-Pots, of which the following is a specification.

My invention relates to the style of coffee-pot usually designated as "one minute," wherein a suspended sack or pocket is provided to receive a quantity of the pulverized coffee-bean upon which boiling water is poured to make the coffee.

The object of the invention is to provide an improved sack or pocket wherein the boiling water will be more thoroughly mixed with the pulverized coffee and be kept in contact therewith for a longer period of time before escaping from the sack, thereby insuring a stronger and better quality of coffee, the liquid percolating through the coffee and passing out of the sack both through its sides and its bottom, but passing more freely through the sides than through the bottom, thereby causing the coffee to adhere more evenly to the sides of the sack, whereby a greater surface of coffee is exposed to the extracting liquid, while at the same time some of the liquid will percolate through the coffee adhering to the bottom and pass through the bottom of the sack.

The invention consists in a coffee-pot having a sack or pocket suspended therein and formed of a porous textile fabric having pervious walls and a pervious bottom, the bottom being thicker and less pervious than the walls.

The accompanying drawing, forming part of this specification, is a vertical section of a coffee-pot embodying my invention.

In the drawing, 2 represents a coffee-pot of the usual form provided with a handle 3, a spout 4, and cover 5. Near the top of the pot I provide an annular rib 6, which supports the ring 7 of the pocket or sack. The coffee sack or pocket is secured to the ring in any suitable manner and depends therefrom within the body of the coffee-pot. This sack consists of walls 8, preferably of some flexible textile material, such as cotton cloth, and sufficiently pervious to permit the free passage of the liquid while preventing the escape of the pulverized coffee from the sack. The bottom 9 of the sack is also preferably made of suitable cotton, considerably thicker and heavier in texture than the walls of the sack, and although not impervious to the passage of the liquid it will retard its flow and cause it to be deflected and to spread over the walls of the sack from the rim to the bottom of the same and mix or mingle thoroughly with the pulverized coffee thereon, so that the entire mass or body of the coffee is subjected to the action of the boiling water and a stronger and better coffee thereby obtained. As the liquid is deflected, the walls being thinner than the bottom, it passes more rapidly through the sides of the sack, thus leaving the coffee more evenly distributed from the rim to the bottom on the walls or sides, the liquid not only passing through the sides, but some of it also passing through the pervious bottom of the sack, but less freely through the bottom than through the sides, because of the bottom being made of thicker and less pervious textile fabric than the sides, whereby the coffee is caused to be more evenly spread upon the sides and retained thereon, so that a greater surface of the coffee is exposed to the contact of the percolating liquid.

I make no claim, broadly, to a sack or pocket formed of two pieces of material sewed together, one piece forming the bottom and the other the walls of the sack; but I believe I am the first to provide such a sack or pocket having the side walls of more pervious material than the bottom, so that the liquid is deflected and mainly passes through the side walls, while some of the liquid will pass through the bottom.

In the drawing I have illustrated the bottom of the sack or pocket made less pervious than the walls by employing a fabric which is thicker and less pervious than the fabric forming the walls of the sack; but, as just stated, the essential feature is in having the bottom formed of a fabric less pervious than the fabric walls of the sack.

By thus spreading the coffee thinly and evenly over the bottom and walls of the sack the hot steam arising from the liquid already percolated will pass through the walls of the sack and through the coffee thereon, and thus fully extract the tincture from the pulverized substance contained on the walls.

It will be understood that while I have referred above to the use of the pot for coffee, it may also be used for tea or for making decoctions from herbs of any kind.

Having thus described my invention, I claim as new and desire to secure by Letters Patent—

In a coffee-pot a sack or pocket suspended from a part of the pot, said sack or pocket being formed of a flexible textile fabric having porous sides and a porous bottom, the bottom being of less porosity than the sides, substantially as described.

In testimony whereof I have hereunto set my hand this 3d day of November, 1900, at Minneapolis, Minnesota.

HARVEY RICKER.

In presence of—
 A. C. PAUL,
 M. C. NOONAN.